Sept. 1, 1964 R. E. YOUNG 3,147,472
BINARY TO DECIMAL CONVERTER
Filed July 19, 1960 3 Sheets-Sheet 1
FIG. I.
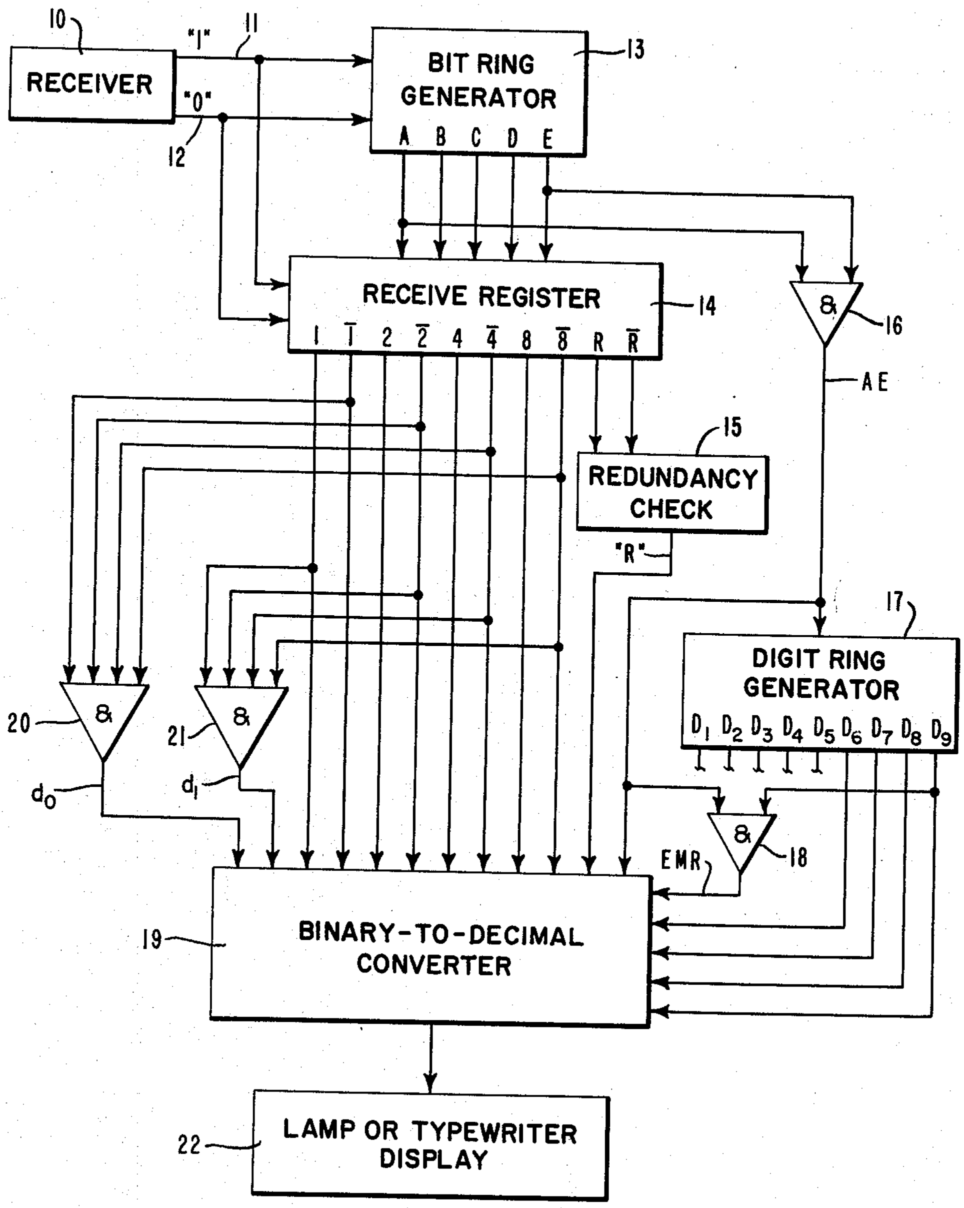
INVENTOR
Robert E. Young
BY Irons, Birch, Swindler & McKie
ATTORNEYS INVENTOR
Robert E. Young
BY Irons, Birch, Swindler & McKie
ATTORNEYS

BINARY TO DECIMAL CONVERTER

Filed July 19, 1960 3 Sheets-Sheet 3

INVENTOR
Robert E. Young

BY Arons, Birch, Swindler & McKie
ATTORNEYS

United States Patent Office 3,147,472
Patented Sept. 1, 1964

3,147,472

BINARY TO DECIMAL CONVERTER

Robert E. Young, Houston, Tex., assignor to Dresser Industries, Inc., Dallas County, Tex., a corporation of Delaware Filed July 19, 1960, Ser. No. 43,755
12 Claims. (Cl. 340—347)

Figures 2A, 2C:
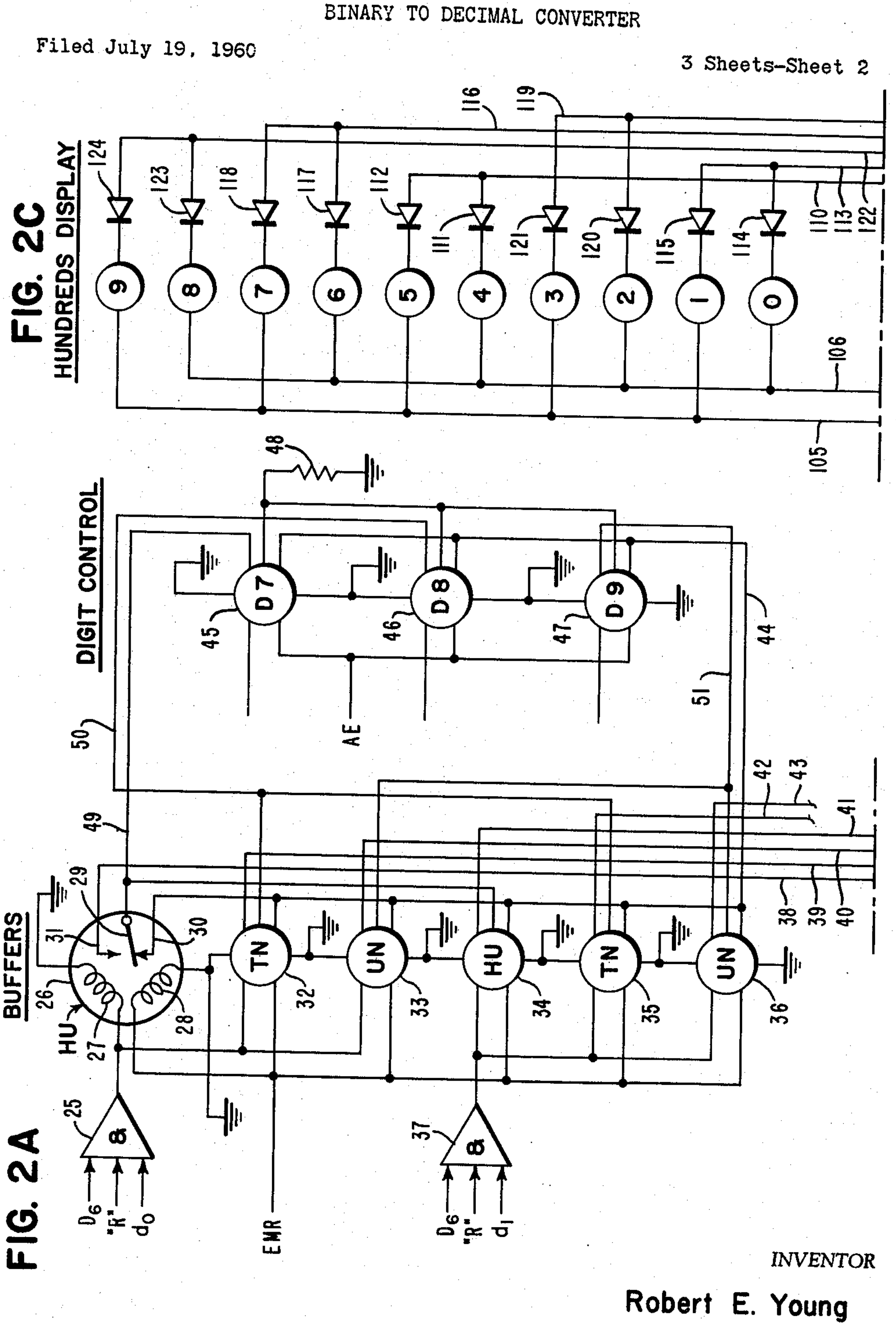

This invention relates to a binary-to-decimal converter memory, and, more particularly, to apparatus for operating a decimal display with a binary-coded decimal digital input, and maintaining a memory of the last digit supplied.

In the prior art it has been suggested to perform a binary to decimal conversion function by the use of relay circuitry. Unfortunately, the usual relay system is relatively unreliable, so that it has been further suggested that a semiconductor diode system be substituted for the relay arrangement. The cost of a semiconductor diode converter is, however, relatively high. The present invention is designed to achieve the high reliability which is characteristic of a semiconductor system but with the relatively low cost of a relay system. Further, through a novel connection of the relays and their switch contact sets, the present invention provides for a substantial reduction in the number of relay contacts necessary to operate the digital display, and consequently for a great reduction in cost of the converter, when using single pole relays, such as the mercury wetted magnetic latching type relay.

The invention will now be more fully described in conjunction with a preferred embodiment thereof shown in the accompanying drawings.

Figure 2B:
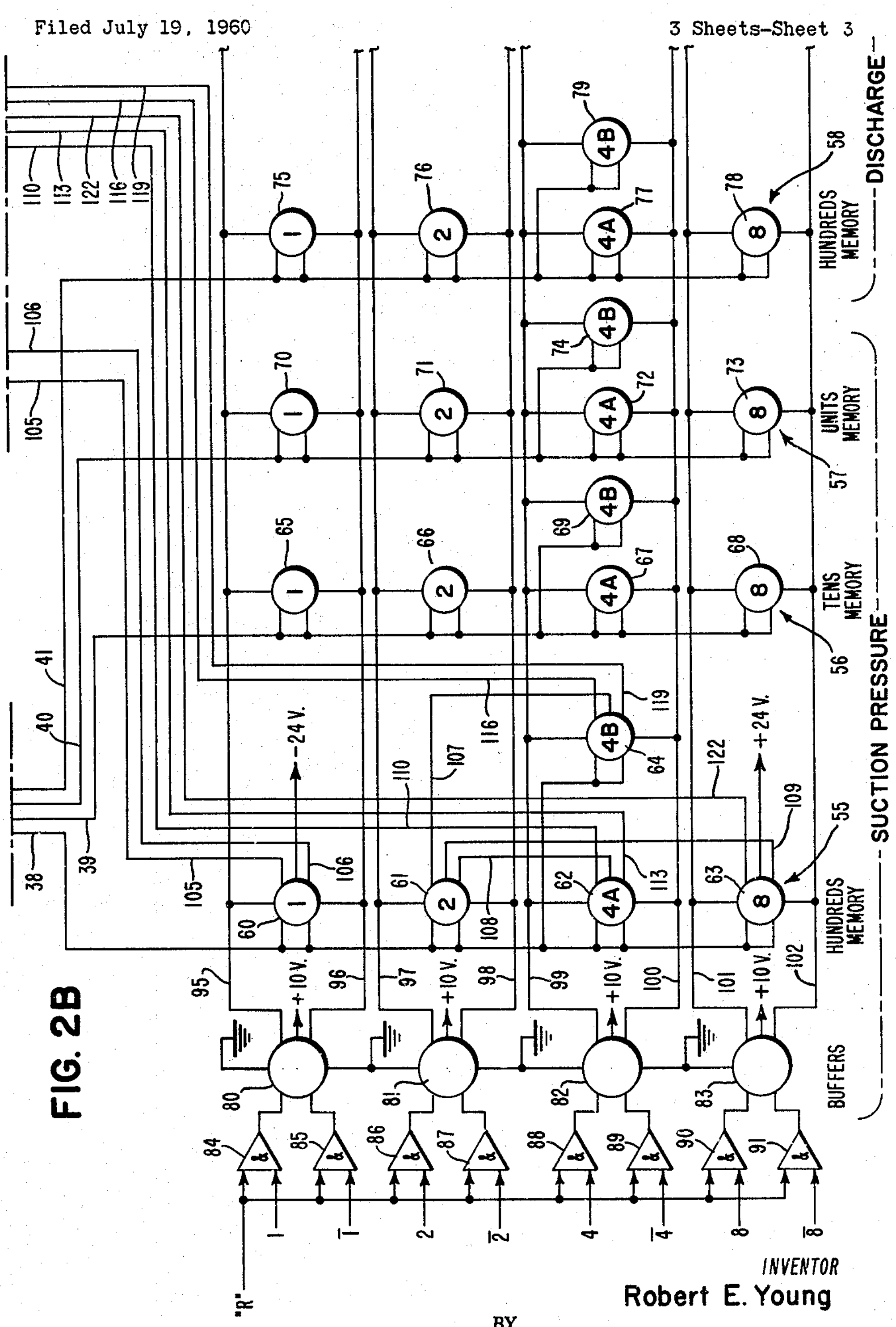

In the drawings,

FIG. 1 is a block diagram of the apparatus of the invention and its connections to the other portions of a digital system;

FIG. 2, consisting of FIGS. 2A, 2B and 2C, is a schematic diagram of the binary-to-decimal converter of FIG. 1, showing the connections to the operating members of a decimal display.

Referring first to FIG. 1, the binary-coded decimal digital input is received by receiver 10 from a transmission line or from a radio path, assuming that the apparatus is part of a conventional digital telemetering device. The receiver converts the received information into serial-by-bit, serial-by-digit binary information, with the binary "1's" separated from the binary "0's" and available respectively on lines 11 and 12. The receiver may be of the type described in the application of Lawrence W. Langley, Serial No. 848,088, filed October 22, 1959, now U.S. Patent No. 3,045,210, issued July 17, 1962, and assigned to the same assignee as the present application.

As shown in FIG. 1, the received bits "1" and "0" are supplied to a bit ring generator 13 which may also be of the type disclosed in the Langley application and which delivers voltage gate signals "A," "B," "C," "D," "E." These gate signals are timed in accordance with the timing of the received bits. The output of the bit ring generator, together with the bit outputs of the receiver are supplied to a receive register 14. This receive register is designated to transform the serial-by-bit digital input into a parallel-by-bit output. The register may be of any type well known to the art and specifically may be quite similar to the bit ring generator of the Langley application. That is, it may include a set of digital "ands" driving a set of flip-flops. The output of the register consists of a series of gate signals, eight in number, which correspond to the presence of a binary "1" or "0" in each of the 1, 2, 4, and 8 positions of the digital input. There is a gate signal "1" when the 1-bit is a 1, but a gate signal $\overline{1}$ when the 1-bit is a 0. Similarly, there are gate signals "2," "$\overline{2}$," "4," "$\overline{4}$," and "8," "$\overline{8}$," when these bits are respectively 1 and 0. Each digit of the input to the receiver may also include a fifth bit which is known as an "R" bit, for redundancy. The purpose of this bit, as explained in the Langley application, is for redundancy checking, and the bit may be used to gate through the digital information contained in the 1, 2, 4, and 8-bits of each digit. When the "R" bit is a 1, the gate signal "R" is supplied, while the gate signal "$\overline{R}$" is supplied when the "R" bit is a 0. These two gate signals are supplied to a conventional redundancy checking apparatus 15, which, after accuracy is checked, supplies a gate signal "R." As will be seen hereinafter, this gate signal "R" is used to gate the information bits through the conversion apparatus.

The A and E gate signals from the bit ring generator 13 are supplied to a digital "and" 16 which supplies an output gate signal AE at the time the two bit gate signals coincide. This occurs between the last bit of one digit and the first bit of the next digit. The AE gate signal is supplied to a digit ring generator 17 to cycle that generator and cause it to develop a series of digit gate signals $D_1$ through $D_9$. These gate signals may be generated by an apparatus of the type shown in the Langley application above identified and co-exist with the various digits of the received message. The first five digits of the received message may be used to supply identification of the station which is sending the message and for performing other functions. The sixth through the ninth digits are the only ones which are used in the conversion apparatus to be described herein.

The $D_9$ gate and AE gate signal are also fed to a digital "and" 18 which is designed to supply a gate signal indicating the end of the received message. This is a re-set gate signal whose function will be described hereinafter and it is identified by the letters "EMR."

The 1–$\overline{8}$ gate signals, the "R" gate, the AE gate signal, the "EMR" gate, and the digit gate signals $D_6$ through $D_9$ are all supplied to the binary-to-decimal converter 19, the novel portion of the apparatus described in this application. The converter is also supplied with gate signals $d_0$ and $d_1$ which are developed from digital "ands" 20 and 21. The subscripts of these gate signals indicate the decimal equivalents of the digits supplied by the receive register. For instance, the "and" 20 receives the $\overline{1}$, $\overline{2}$, $\overline{4}$, and $\overline{8}$ gate signals so that it supplies an output only when each of the information bits of the received digit is a binary 0, corresponding to decimal 0. In like manner, the "and" 21 receives the 1, $\overline{2}$, $\overline{4}$, and $\overline{8}$ gate signals, so that it supplies an output only when the decimal equivalent of the received information bits of a digit corresponds to the decimal number 1.

The binary-to-decimal converter 19 is designed to energize a lamp or typewriter display 22 in a manner now to be described. The lamp or typewriter display may include a number of separate electrically-controllable operating elements, such as the lamps identified as the decimal numbers 0–9 in FIG. 2C. It will be seen from FIG. 2 that only the specific elements of a lamp display are shown, but it will be evident that the corresponding operating elements of a typewriter may be substituted for the lamps and the converter apparatus used to drive a typewriter read-out.

Referring now to FIG. 2, and, in particular, FIG. 2A, the received digital information may be used to identify the readings of each of a plurality of different transducers. For instance, it may be desired to indicate the suction pressure and the discharge pressure at a gas-pumping station located remotely from the receiver. In order that the receiving equipment may distinguish between the separate transducers which are being indicated at any one instant, the sixth one of the received digits is coded to indicate which of the transducers at the remote station is being read out at any instant. The decimal number 0, for instance, may be used to indicate that the following reading is to correspond to the suction pressure while the decimal number 1 may be used to indicate discharge pressure. In order that the appropriate decimal display may be energized, depending upon which of the transducers is being read out, the gate signal $d_0$ is combined with the "R" gate and the $D_6$ gate signal at the input digital "and" 25. This "and" supplies an output gate signal only when these three gate signals co-exist, thus indicating that all of the bits of the sixth digit have been received and checked and that the decimal equivalent of the information bits of that digit is decimal 0. The output of "and" 25 is supplied to a relay 26 which may be of the mercury-wetted type which includes a pair of operating coils 27 and 28, a movable contact 29, and a pair of stationary contacts 30 and 31. The relay is designed such that the movable contact 29 engages stationary contact 30 when the operating coil 28 is energized, while the movable contact engages stationary contact 31 when the coil 27 is energized. The relay also has a characteristic such as to maintain its movable contact in the position to which it was last urged. In other words, it is of the memory type. One end of the operating coil 27 is connected to ground, while the other end is connected to the output of the digital "and" 25. One end of the coil 28 is also grounded, while its other end is supplied with the "EMR" or end of message reset gate signal.

It will be seen hereinafter that the converter apparatus of this invention includes a number of relays of the type identified by the numeral 26. For simplicity purpose, these relays are not drawn out in detail but are merely identified by a circular symbol, with the appropriate connections to the terminals corresponding to those of relay 26.

The relay 26 has been identified with the letters "HU" indicating that it corresponds to the hundreds digit. The relay 26, together with similar relays 32 through 36, form a set of buffer relays, with relays 32 and 33 being used for the tens and units digits and being therefore identified with the letters "TN" and "UN." The relays 34, 35 and 36 are used for the hundreds through units digits of the identification of the reading of another transducer, shown herein as the discharge pressure transducer. Relay 34 is the hundreds buffer relay, relay 35 is the tens buffer relay, and relay 36 is the units buffer relay, for this transducer.

The first operating coils of relays 32 and 33 are each connected across the operating coil 27 of buffer relay 26, so that, when an output is available from digital "and" 25, each one of these coils is energized to move the movable contact 29 into engagement with the upper (as shown in the drawing) stationary contact.

It will be seen that one end of each of the operating coils of the various buffer relays is connected to ground.

The buffer relays 34–36 receive operating voltage from a digital "and" 37 which, like "and" 25, is supplied with the "R" and $D_6$ gate signals. Also, "and" 37 is supplied with the $d_1$ gate signal, indicating a decimal 1 which itself indicates that the following three digits of the received message correspond to the hundreds, tens, and units value of the suction pressure transducer reading. The output of "and" 37 is supplied to one end of each of the first operating coils of the relays 34–36, while the EMR gate signal is supplied to the corresponding end of the second operating coil of each of these relays.

As shown in FIG. 2A, the upper stationary contacts of the relays 26 and 32 through 36, are connected to the apparatus of FIG. 2B, by leads 38–43, respectively. The other stationary contacts are connected together and by a lead 44 to a set of digit control relays 45 through 47. These relays are of the same type as the buffer relays, and are used to control the buffer relays in accordance with the various digits of the received message. Specifically, the relay 45 is supplied with the $D_7$ gate signal and is used to control the hundreds buffer relays 26 and 34. Similarly, the relay 46 is used to control the tens buffer relays 32 and 35, while the relay 47 controls the units buffer relays 33 and 36.

One end of each of the operating coils of each of relays 45–47 is connected to ground. The other end of the upper coil of relay 45 is supplied with gate signal $D_7$, while the other ends of the upper coils of relays 46 and 47 are respectively supplied with gate signals $D_8$ and $D_9$. The other ends of the lower operating coils are all connected together and supplied with gate signal AE, indicating the time between digits.

The movable contacts of the relays 45–47 are all connected together and through a resistor 48 to ground. The lower stationary contacts are also connected together and through lead 44 to the lower stationary contacts of the buffer relays. The upper stationary contact of digit control relay 45 is connected by lead 49 to the movable contacts of each of buffer relays 26 and 34, while the upper stationary contact of relay 46 is connected by lead 50 to the movable contacts of tens relays 32 and 35, and the upper stationary contact of buffer relay 47 is connected by lead 51 to the movable contacts of units relays 33 and 36.

With the arrangement of the elements of FIG. 2A, when the sixth digit is a decimal 0, indicating that the reading of the suction pressure transducer is to be transmitted during the seventh through the ninth digits, the buffer relays 26, 32 and 33 are energized. Then, when the seventh digit arrives, the upper operating coil of digit control relay 45 is energized by the $D_7$ gate signal output of digit ring generator 17, thereby connecting the movable contact of relay 45 to the upper stationary contact of relay 45, and the lead 38 from the buffer relay 26 is connected to ground through resistor 48 since lead 49 from relay 45 remained connected to lead 38 through the upper stationary and movable contacts of relay 26 following the disappearance of the $D_6$ gate signal because of the memory character of the relays as described above. The relay 45 is re-set by operation of its lower operating coil when the gate signal AE comes up between received digits, and, when the eighth digit arrives, the digit control relay 46 is energized to connect the lead 39 to ground. Similarly, when the ninth digit arrives, the relay 47 connects the lead 40 to ground.

When the sixth digit is a decimal 1, indicating that the reading of the discharge pressure transducer is to be transmitted during digits $D_7$ through $D_9$, the relays 34 through 36 are energized, rather than the relays 26, 32 and 33, during the seventh through the ninth received digits. Thereby, leads 41 through 43 are sequentially connected to ground.

Referring now to FIG. 2B, the leads 38 through 40 are there shown as connected to a set of hundreds memory relays 55, a set of tens memory relays 56, and a set of units memory relays 57, all corresponding to the suction pressure display. The lead 41 is shown connected to hundreds memory relays 58, but the memory relays connected to the leads 42 and 43 are not shown, for simplicity reasons, since the principle of the apparatus will be evident from the apparatus that is shown.

It will be seen that the hundreds memory relays, of the same type as the buffer and digit control relays of FIG. 2A, consist of five relays identified by the numerals 60 through 64. Since the functions of these relays generally correspond to the bits received in each of the 1, 2, 4, and 8 positions of the digit, the relays are identified also with these numbers. However, the relays 62 and 64 are both identified by the number 4 with the suffix A and B used for the two different relays.

One end of each of the operating coils of all of the relays 60 through 64 is connected to lead 38 to receive a connection to ground during the seventh digit when suction pressure is being received. Similarly, the tens memory relays 65 through 69 have one end of each of their operating coils connected to lead 39, while the units memory relays 70 through 74 and the discharge pressure hundreds memory relays 75 through 79 respectively have one end of each of their operating coils connected to leads 40 and 41.

The other ends of the operating coils of the memory relays 55–58 receive operating voltage from a set of buffer relays 80–83. The buffer relays are of the same type as the other relays described and all have one end of each of their operating coils grounded. The other end of the upper operating coil of relay 80 is supplied with voltage through a digital "and" 84, while the other end of the lower operating coil of relay 80 is supplied with voltage from an "and" 85. The other buffer relays 81 through 83 are similarly energized from digital "ands" 86 and 87, 88 and 89 and 90 and 91. The "ands" 84 through 91 are each designed to supply operating voltage only when a pair of input gate signals is available for that "and." The checked redundancy gate signal "R" is supplied to each of the "ands," while the bit gate signals 1 through $\bar{8}$ are supplied to the respective "ands" 84 through 91. The movable contact of each of the buffer relays 80 through 83 is connected to the positive side or terminal of a suitable source of energizing voltage (not shown). The upper stationary contact of buffer relay 80 is connected to a common bus wire 95, while the lower stationary contact is connected to bus 96. Similarly, the upper stationary contact of relay 81 and the lower stationary contact thereof are connected to respective bus wires 97 and 98. Also, the upper stationary contact of relay 82 and the lower stationary contact thereof are connected respectively to bus wires 99 and 100. Finally, the upper stationary contact and the lower stationary contact of buffer relay 83 are respectively connected to bus wires 101 and 102.

The common or bus wire 95 is connected to the other end of the upper operating coil of each of hundreds memory relay 60, tens memory relay 65, units memory relay 70 and hundreds memory relay 75. The bus 96 is connected to the corresponding end of the lower operating coils of the same relays. The bus wires 97 and 98 are similarly connected to the other ends of the upper and lower operating coils, respectively, of the relays 61, 66, 71 and 76. Also, the bus wires 99 and 100 are connected to the other ends of the upper and lower operating coils of the respective relays 62, 64, 67, 69, 72, 74, 77 and 79. Finally, the bus wire 101 is connected to the other end of the upper operating coil of each of relays 63, 68, 73 and 78 while the bus wire 102 is connected to the other end of the lower operating coil of each of the same relays. It will be evident that this system permits extension of the apparatus as far as desired in order to operate the hundreds, tens, and units display lamps of each of a number of different displays. As a matter of fact, there is no necessity for limitation to only three digits of display for any one transducer.

The operation of the apparatus so far described will be detailed hereinafter in conjunction with the operation of the display lamps of FIG. 2C. It will be seen that only one display is illustrated in the drawings, that display corresponding to the hundreds memory relays 55. It will be evident, however, that the invention contemplates the use of one display for each of the number of sets of memory relays employed in the apparatus.

The hundreds display of FIG. 2C contains lamps 0–9 operable when energized to illuminate the corresponding decimal numbers. These lamps need not be further described, since they may be of any type well known to the art. The lamps used in an actual embodiment of the apparatus of the invention were designed to be operated from a 48 volts D.-C. source, and the positive side of that source is shown as connected to the movable contact of hundreds memory relay 63. The negative side of the source is connected to the movable contact of relay 60. The upper stationary contact of relay 60 is connected by lead 105 to one side of each of the odd-numbered lamps in the display, while the lower stationary contact is connected by lead 106 to the corresponding side of each of the even-numbered lamps of the display, including the "0" lamp. The upper stationary contact of hundreds memory relay 61 is connected by lead 107 to the movable contact of relay 64, while the lower stationary contact thereof is connected by lead 108 to the movable contact of relay 62. The movable contact of relay 61 is connected to the lower stationary contact of relay 63 through lead 109.

The upper stationary contact of relay 62 is connected by lead 110 to the other sides of the "4" and "5" lamps through diodes 111 and 112. The lower stationary contact of relay 62 is connected by lead 113 to the other sides of the "0" and "1" lamps through diodes 114 and 115. The upper stationary contact of relay 64 is connected by lead 116 to the other sides of the "6" and "7" lamps through diodes 117 and 118. The lower stationary contact of relay 64 is connected by lead 119 to the other side of each of the "2" and "3" lamps through diodes 120 and 121. The upper stationary contact of relay 63 is connected by lead 122 to the other side of each of the "8" and the "9" lamps through diodes 123 and 124.

In operation of the apparatus to illuminate the appropriate lamp of the hundreds display corresponding to the suction pressure transducer, the sixth received digit is a 0 so that the buffer relays 27, 32 and 33 each have their upper operating coils energized. When the seventh digit arrives, the digit control relay 45 has its upper coil energized, thus putting ground on lead 38. Thereby, one side of each of the operating coils of the hundreds memory relays 60–64 is each connected to ground. Now, assuming that the seventh digit is the equivalent of a decimal 6, the 2 and 4-bits of the seventh digit will be 1's, while the 1 and 8-bits will be each 0. Therefore, the lower coils of buffer relays 80 and 83 will each be energized, while the upper coils of relays 81 and 82 will be energized. These conditions cause the lower coils of memory relays 60 and 63 to be energized, while the upper coils of memory relays 61, 62 and 64 will be energized. Now, going to the "6" lamp, it will be seen that lead 106, connected to one side of that lamp is connected through the lower stationary contact of memory relay 60 to the negative side of the operating voltage source. The other side of the "6" lamp is connected through 116, the upper and movable contacts of relay 64, the upper and movable contacts of relay 61, and the lower and movable contacts of relay 63 to the positive side of the source. Thereby, the "6" lamp is energized. The operating circuits for the other lamps of the display may be readily traced and it will be seen that no other lamp is energized when the seventh digit is a decimal 6.

As indicated, the connections to the appropriate displays for the other memory relay sets may be identical to those shown in FIG. 2C for the hundreds memory relay set.

It will be evident that many minor changes could be made in the apparatus described as illustrative of the invention. In particular, the specific type of relay which has been disclosed herein is not essential to operation of the apparatus, though this type is preferred because of its desirable characteristics. The important features of the invention are the connections of the memory relay sets employing the common bus wires or connections, and the particular connection of the relay contacts or switch sets of these memory relays. This particular connection enables the applicant to obtain the desirable result of high precision and high reliability operation with a minimum of relays.

In view of the fact that many changes could be made in the apparatus without departure from the scope of the invention, the invention is not to be considered to be limited to the particular embodiment described herein but rather only by the scope of the appended claims.

I claim:

1. Apparatus for operating a decimal display with a binary-coded-decimal digital input, comprising a set of five single pole double throw memory type relays each having two sets of contacts and a pair of operating coils operable to close the relay in one direction through a first of said two sets of contacts when one coil is energized and in a second direction through the second of said two sets of contacts when the second coil is energized, a source of energizing voltage, first means connecting one end of each of said operating coils of all five relays together and to one side of said source, second means including a pair of separate circuits for each of four of said relays respectively connecting the second end of each of said operating coils of said four relays to the second side of said source when the respective separate circuit is complete, the first and second circuit of each said circuit pair being connected respectively to the second ends of the first and second of the operating coils of different ones of said four relays respectively, said fifth relay having the second end of each of its operating coils connected to said second end of the corresponding coil of the third relay, said second means including means for controlling said circuits by said digital input with the four bits of the binary-coded-decimal digital input respectively connected to control the first, second, third and fourth pairs of said circuits, with each bit when it is a 1 completing the first one of its corresponding circuit pair and when it is a 0 completing the second one of its corresponding circuit pair, and means including devices having asymmetrical conduction characteristics connected between the contact sets of said relays and the decimal display operable to energize one element of said decimal display only in accordance with which ones of the contact sets are engaged.

2. The apparatus of claim 1 in which said second means includes four memory type buffer relays each having a one set and a second set of contacts and a pair of operating coils operable to engage said one set of buffer relay contacts when its one coil is energized and said second set of buffer relay contacts when its second coil is energized, the first and second circuits of each of said four pairs of circuits including said first and said second contact sets of said four buffer relays, respectively, the four bits of said digital input being supplied to control the operating coils of the buffer relays respectively, with each bit when it is a 1 being operable to energize the first of the operating coils of the corresponding buffer relay and when it is a 0 being operable to energize the second of the operating coils of said corresponding buffer relay.

3. The apparatus of claim 1 in which said decimal display includes an electrically-controllable operating member for each of the decimal numbers 0–9, and a second source of energizing voltage for said operating members, the contact sets of said five relays cooperable in their various positions to form ten separate circuits for the respective 0–9 operating members with each circuit operable to connect its operating member across said second source; the ten circuits including, respectively, the following ones of the following contact sets:

First: said second contact set of each of the first through fourth relays;

Second: said first contact set of the first relay and said second contact set of each of the second through fourth relays;

Third: said first contact set of the second relay and said second contact set of each of the first, fourth and fifth relays;

Fourth: said first contact set of each of the first and second relays and said second contact set of each of the fourth and fifth relays;

Fifth: said first contact set of the third relay and said second contact set of each of the first, second and fourth relays;

Sixth: said first contact set of each of the first and third relays and said second contact set of each of the second and fourth relays;

Seventh: said first contact set of each of the second and fifth relays and said second contact set of each of the first and fourth relays;

Eighth: said first contact set of each of the first, second and fifth relays and said second contact set of the fourth relay;

Ninth: said first contact set of the fourth relay and said second contact set of the first relay;

Tenth: said first contact set of each of the first and fourth relays.

4. Apparatus for operating a decimal display with a binary-coded-decimal digital input having at least two digits each including a "1," "2," "4" and "8" bit, comprising two sets of five single pole double throw memory type relays each, each of said relays having two sets of contacts and a pair of operating coils and operable to close the relay in one direction through the first of said two sets of contacts when one coil is energized and in a second direction through the second set of contacts when the second coil is energized, a source of energizing voltage, first means connecting one end of each of said operating coils of all five relays of each set together and to one side of said source, second means including first and second sets of four pairs of separate circuits, one set of circuits for each of said sets of relays, with the first and second circuit of each circuit pair operable respectively to connect the second ends of the first and the second of the operating coils of different ones of four of said relays of each set to the other side of said source when the circuit is complete, the fifth relay of each set having the second end of each of its operating coils connected to said second end of the corresponding operating coil of the third relay of its set of relays, said second means including means for controlling the first and second sets of circuits respectively by the first and second digits of said input with the "1," "2," "4" and "8" bits of each digit respectively connected to control the first, second, third and fourth pair of the associated circuits, with each bit when it is a 1 completing the first one of its corresponding circuit pair and when it is a 0 completing the second one of its corresponding circuit pair, and means including devices having asymmetrical conduction characteristics connected between the contact sets of said relays and the decimal display operable to energize it in accordance with which ones of the contact sets are engaged.

5. The apparatus of claim 4 in which said digits arrive serially and said first means includes first and second digit control memory type relays each having a pair of operating coils and a contact set which is engaged when the first one of the operating coils is energized and is disengaged when the second operating coil is energized, means for developing a first and a second gate voltage signal during the first and second digits of said input, respectively, means for developing a third gate voltage signal between the last bit of the first input digit and the first bit of the second input digit, means supplying said first gate voltage signal to the first operating coil of said first digit control relay and said second gate voltage signal to the first operating coil of said second digit control relay to energize those coils during the duration of the respective gate voltage signals, means supplying said third gate voltage signal to the second operating coils of each of the first and second digit control relays to energize them after each input digit, said contact sets of said first and second digit control relays being respectively connected between said one side of said source and said one end of each of the operating coils of the first and second sets of five relays.

6. The apparatus of claim 5 in which said second means includes four memory type buffer relays each having first and second operating coils and first and second sets of contacts and operable to engage said first set of contacts when said first coil is energized and said second set of contacts when said second coil is energized, the first and second ones of each of said four pairs of circuits of both of said first and second sets of circuits including said first and said second contact sets of said four buffer relays, respectively, the "1," "2," "4" and "8" bits of each digit of the input being respectively supplied to control the operating coils of said four buffer relays, with each bit when it is a 1 being operable to energize said first operating coil and when it is a 0 being operable to energize said second operating coil of said buffer relays.

7. The apparatus of claim 6 in which said decimal display includes an electrically-controllable operating member for each of the decimal numbers 0–9 for each digit of the input, and in which said energizing means for said decimal display includes a second source of energizing voltage for said operating members and ten separate circuits for the 0–9 operating members of each set, respectively, with each circuit operable when completed to connect its operating member across said source; the ten circuits for each set of operating members including, respectively, the following ones of the following relay contact sets:

First: said second contact set of each of the first through fourth relays;
Second: said first contact set of the first relay and said second contact set of each of the second through fourth relays;
Third: said first contact set of the second relay and said second contact set of each of the first, fourth and fifth relays;
Fourth: said first contact set of each of the first and second relays and said second contact set of each of the fourth and fifth relays;
Fifth: said first contact set of the third relay and said second contact set of each of the first, second and fourth relays;
Sixth: said first contact set of each of the first and third relays and said second contact set of each of the second and fourth relays;
Seventh: said first contact set of each of the second and fifth relays and said second contact set of each of the first and fourth relays;
Eighth: said first contact set of each of the first, second and fifth relays and said second contact set of the fourth relay;
Ninth: said first contact set of the fourth relay and said second contact set of the first relay;
Tenth: said first contact set of each of the first and fourth relays.

8. Apparatus for operating a decimal display with a binary-coded-decimal digital input, comprising five pairs of sets of switch means with the first through fourth sets being controlled by the "1," "2," "4" and "8" bits, respectively, of the digital input and with the first and second one of each pair being closed when the respective bit is a 1 and a 0, respectively, the fifth set being controlled in the same manner as the third set by the "4" bit, the decimal display including an asymmetrical conduction device and an electrically-controllable operating member for each of the decimal numbers 0–9, and a source of energizing voltage for said operating members, and ten circuits for the respective 0–9 operating members with each circuit operable when completed to connect its operating member across said source; the ten circuits including, respectively, the following ones of the following switch sets:

First: the second of each of the first through fourth sets;
Second: the first of the first set and the second one of each of the second through fourth sets;
Third: the first of the second set and the second one of each of the first, fourth and fifth sets;
Fourth: the first of each of the first and second sets and the second of each of the fourth and fifth sets;
Fifth: the first of the third set and the second one of each of the first, second and fourth sets;
Sixth: the first of each of the first and third sets and the second of each of the second and fourth sets;
Seventh: the first of each of the second and fifth sets and the second of each of the first and fourth sets;
Eighth: the first of each of the first, second and fifth sets and the second of the fourth set;
Ninth: the first of the fourth set and the second one of the first set;
Tenth: the first of each of the first and fourth sets.

9. Apparatus for operating a decimal display with a binary-coded-decimal digital input of at least two digits each including a "1," "2," "4" and "8" bit and which arrive in serial-by-digit, serial-by-bit fashion, comprising means for translating the input into corresponding serial-by-digit, parallel-by-bit voltage 1, $\bar{1}$, 2, $\bar{2}$, 4, $\bar{4}$, 8, $\bar{8}$ gate signals, depending upon whether the respective bit is a 1 or a 0; first through fourth buffer relays each having first and second operating coils, a movable and a first and a second stationary contact and operable to engage the movable contact with the first stationary contact when the first operating coil is energized and to engage the movable contact with the second stationary contact when the second coil is energized, a source of energizing voltage having first and second terminals, the movable contacts of said relays each being connected to the first terminal of said source; a first and a second set of "1," "2," "4A," "4B," and "8" memory relays each having first and second operating coils, a movable contact and first and second fixed contacts and being operable to engage the movable contact with the first fixed contact when the first coil is energized and operable to engage the movable contact with the second fixed contact when the second coil is energized; means connecting one end of each of the operating coils of the first of said sets of memory relays to the second terminal of said source during the first digit of said input, means connecting the first end of each of the operating coils of the second of said sets of memory relays to the second terminal of said source during the second digit of said input; the first and second stationary contacts of said first buffer relay being connected respectively to the second end of the first and the second operating coils of each of said "1" relays; the first and second stationary contacts of said second buffer relay being connected respectively to the second end of the first and the other operating coils of each of said "2" relays; the first and second stationary contacts of said third buffer relay being connected respectively to the second end of the first and the second operating coils of each of said "4A" and "4B" relays; the first and second stationary contacts of said fourth buffer relay being connected respectively to the second end of the first and the second operating coils of each of said "8" relays; a source of energizing voltage for the decimal display, and means including devices having asymmetrical conduction characteristics connected between the contacts of said memory relays, said last-mentioned source and the decimal display operable to energize the decimal display in accordance with which ones of the contacts of the memory relays are engaged.

10. The apparatus of claim 9 in which said decimal display includes an electrically-controllable operating member for each of the decimal numbers 0–9 for each digit of the input and in which said last-mentioned means and the contacts of said memory relays cooperate in their various positions to form ten separate circuits for the 0–9 operating members of each set thereof, respectively, with each circuit operable when completed to connect its operating member across said source; the ten circuits including, respectively, the following ones of the following memory relay contacts:

First: the movable contact and the second fixed contact of each of the "1," "2," "4A" and "8" memory relays;
Second: the movable contact and the first fixed contact of the "1" memory relay, and the movable contact and the second fixed contact of each of the "2," "4A" and "8" memory relays;

Third: the movable contact and the first fixed contact of the "2" memory relay, and the movable contact and the second fixed contact of each of the "1," "4B" and "8" memory relays;

Fourth: the movable contact and the first fixed contact of each of the "1" and "2" memory relays, and the movable contact and the second fixed contact of each of the "4B" and "8" memory relays;

Fifth: the movable contact and the first fixed contact of the "4A" memory relay, and the movable contact and the second fixed contact of each of the "1," "2" and "8" memory relays;

Sixth: the movable contact and the first fixed contact of each of the "1" and "4A" memory relays and the movable contact and the second fixed contact of each of the "2" and "8" memory relays;

Seventh: the movable contact and the first fixed contact of each of the "2" and "4B" memory relays, and the movable contact and the second fixed contact of each of the "1" and "8" memory relays;

Eighth: the movable contact and the first fixed contact of each of the "1," "2" and "4B" memory relays, and the movable contact and the second fixed contact of the "8" memory relay;

Ninth: the movable contact and the first fixed contact of the "8" memory relay, and the movable contact and the second fixed contact of the "1" memory relay;

Tenth: the movable contact and the first fixed contact of the "1" and the "8" memory relays.

11. The apparatus of claim 1 in which the four bits of the binary coded input have weights of "1," "2," "4" and "8."

12. The apparatus of claim 2 in which the four bits of the binary coded input have weights of "1," "2," "4" and "8."

References Cited in the file of this patent

UNITED STATES PATENTS

| | | |
|---|---|---|
| 2,848,708 | Burkhart et al. | Aug. 19, 1958 |
| 2,892,185 | Briggs | June 23, 1959 |
| 2,895,124 | Harris | July 14, 1959 |
| 2,991,460 | Hill | July 4, 1961 |